United States Patent
Suto et al.

(10) Patent No.: US 8,994,752 B2
(45) Date of Patent: Mar. 31, 2015

(54) IMAGE PROCESSING DEVICE, IMAGE PROCESSING METHOD, AND PROGRAM

(75) Inventors: Yasuhiro Suto, Tokyo (JP); Kouichi Matsuda, Tokyo (JP); Masaki Fukuchi, Tokyo (JP); Kenichiro Oi, Kanagawa (JP); Jingjing Guo, Tokyo (JP)

(73) Assignee: Sony Corporation, Tokyo (JP)

( * ) Notice: Subject to any disclaimer, the term of this patent is extended or adjusted under 35 U.S.C. 154(b) by 618 days.

(21) Appl. No.: 13/015,566

(22) Filed: Jan. 27, 2011

(65) Prior Publication Data

US 2011/0187726 A1 Aug. 4, 2011

(30) Foreign Application Priority Data

Feb. 2, 2010 (JP) ................................ P2010-021369

(51) Int. Cl.
*G09G 5/00* (2006.01)
*G06T 13/00* (2011.01)
(52) U.S. Cl.
CPC .................................... *G06T 13/00* (2013.01)
USPC .......................................... 345/633; 345/473
(58) Field of Classification Search
None
See application file for complete search history.

(56) References Cited

U.S. PATENT DOCUMENTS

| | | | | |
|---|---|---|---|---|
| 2006/0036700 A1* | 2/2006 | Hachiya et al. | ............... | 709/206 |
| 2008/0077863 A1* | 3/2008 | Jong et al. | ....................... | 715/277 |
| 2008/0304707 A1* | 12/2008 | Oi et al. | ......................... | 382/103 |
| 2009/0216446 A1* | 8/2009 | Ma et al. | ........................ | 701/213 |
| 2012/0016578 A1* | 1/2012 | Coppens | ........................ | 701/201 |

FOREIGN PATENT DOCUMENTS

JP 2008-304268 12/2008

OTHER PUBLICATIONS

MrngStarr "Animated CompTIA Network+Video Course at PowerCert.com" available on http://www.youtube.com/watch?v=mlrtZub0UxM since May 17, 2008.*
Intel® PRO/Wireless 3945ABG Network Connection User Guide 2005.*
"Pigeon Holds a Letter" available http://web.archive.org/web/20091106055614/http://www.supercoloring.com/pages/pigeon-holds-a-letter/ online since 2009.*
A. Davison, "Real-Time Simultaneous Localisation and Mapping with a Single Camera", Robotics research Group, dept. of Engineering Science, University of Oxford, OX1 3PJ, UK, Computer Vision, 2003. Proceedings. Ninth IEEE International Conference on Oct. 13-16, 2003.

* cited by examiner

*Primary Examiner* — Xiao M. Wu
*Assistant Examiner* — Yingchun He
(74) *Attorney, Agent, or Firm* — Sherr & Jiang, PLLC

(57) ABSTRACT

There is provided an image processing device including: a data storage unit having feature data stored therein, the feature data indicating a feature of appearance of one or more physical objects; an environment map building unit for building an environment map based on an input image obtained by imaging a real space using an imaging device and the feature data stored in the data storage unit, the environment map representing a position of a physical object present in the real space; an information generating unit for generating animation data for displaying a status of communication via a communication interface on a screen, using the environment map built by the environment map building unit; and an image superimposing unit for generating an output image by superimposing an animation according to the animation data generated by the information generating unit on the input image.

20 Claims, 20 Drawing Sheets

FIG.11

| COMMUNICATION SERVICE EXAMPLE | | EXAMPLE OF STATUS |
|---|---|---|
| APPLICATION | ELECTRONIC MAIL | TRANSMITTING MAIL, RECEIVING, COMPLETION, FAILURE etc |
| | SMS | TRANSMITTING MESSAGE, COMPLETION, FAILURE etc |
| | VoIP | CALLING, BUSY etc |
| MIDDLEWARE | WIRELESS ACCESS | ATTEMPTING TO ACCESS, CONNECTING etc |
| | IrDA COMMUNICATION | ATTEMPTING TO ACCESS, IN DATA COMMUNICATION etc |

FIG.13

| SERVICE TYPE | STATUS | TYPE OF ANIMATION |
|---|---|---|
| ELECTRONIC MAIL | TRANSMITTING MAIL | AGENT GOES OUT |
| | RECEIVING MAIL | AGENT COMES IN |
| | COMPLETED | AGENT REACHES END POINT |
| | FAILED | AGENT GOES BACK |
| WIRELESS ACCESS | ATTEMPTING TO ACCESS | ARROW EXTENDS TO WIRELESS AP |
| | CONNECTING | CABLE IS CONNECTED TO WIRELESS AP |

| SERVICE TYPE | COMMUNICATION PARTY | POSITION OF START POINT | POSITION OF END POINT | SUPPLEMENT |
|---|---|---|---|---|
| ELECTRONIC MAIL | REGISTERED USER | SELF-POSITION | REGISTERED POSITION | IN TRANSMISSION |
| | | REGISTERED POSITION | SELF-POSITION | IN RECEPTION |
| | NON-REGISTERED USER | SELF-POSITION | WINDOW (FROM ENVIRONMENT MAP) | IN TRANSMISSION |
| | | WINDOW (FROM ENVIRONMENT MAP) | SELF-POSITION | IN RECEPTION |
| WIRELESS ACCESS | WIRELESS AP | SELF-POSITION | POSITION OF WIRELESS AP (FROM ENVIRONMENT MAP) | |

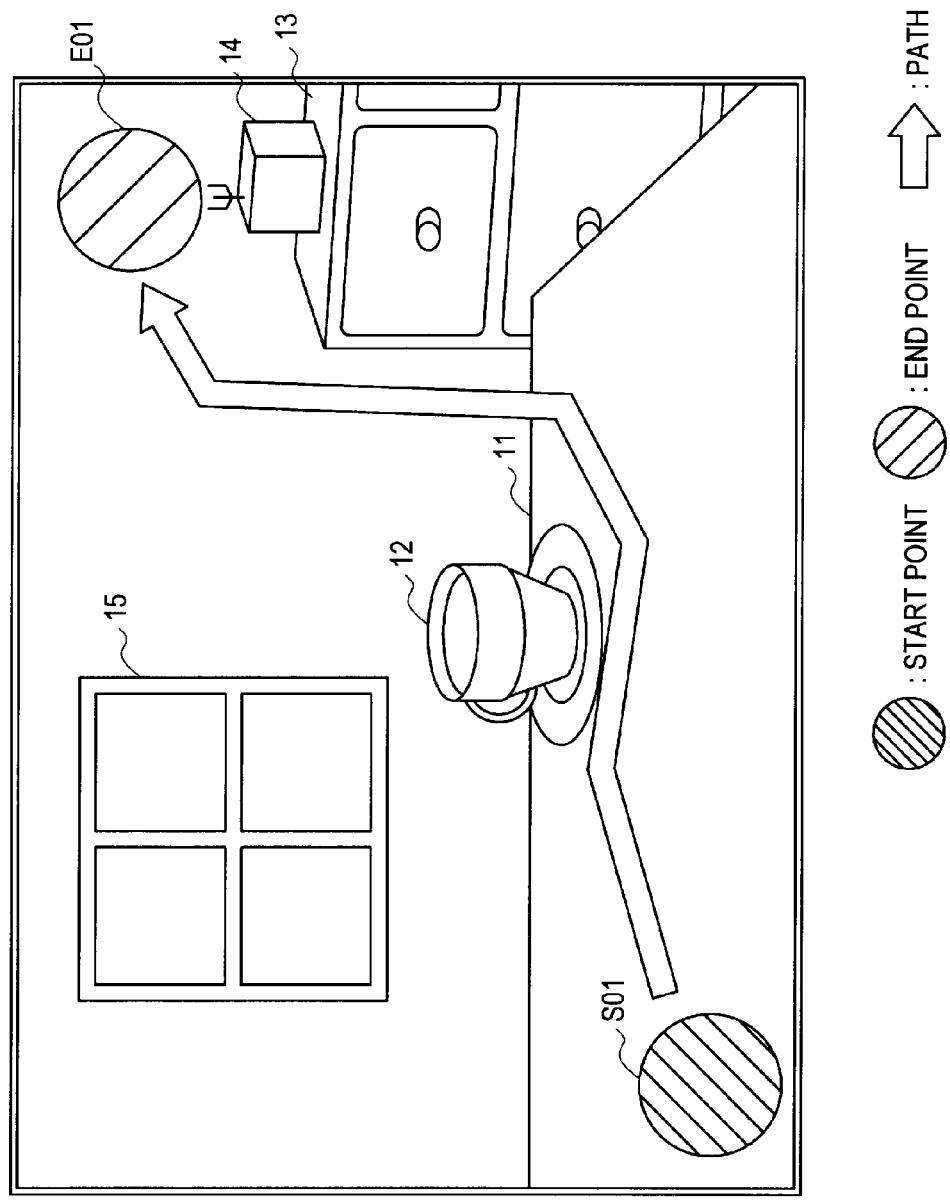

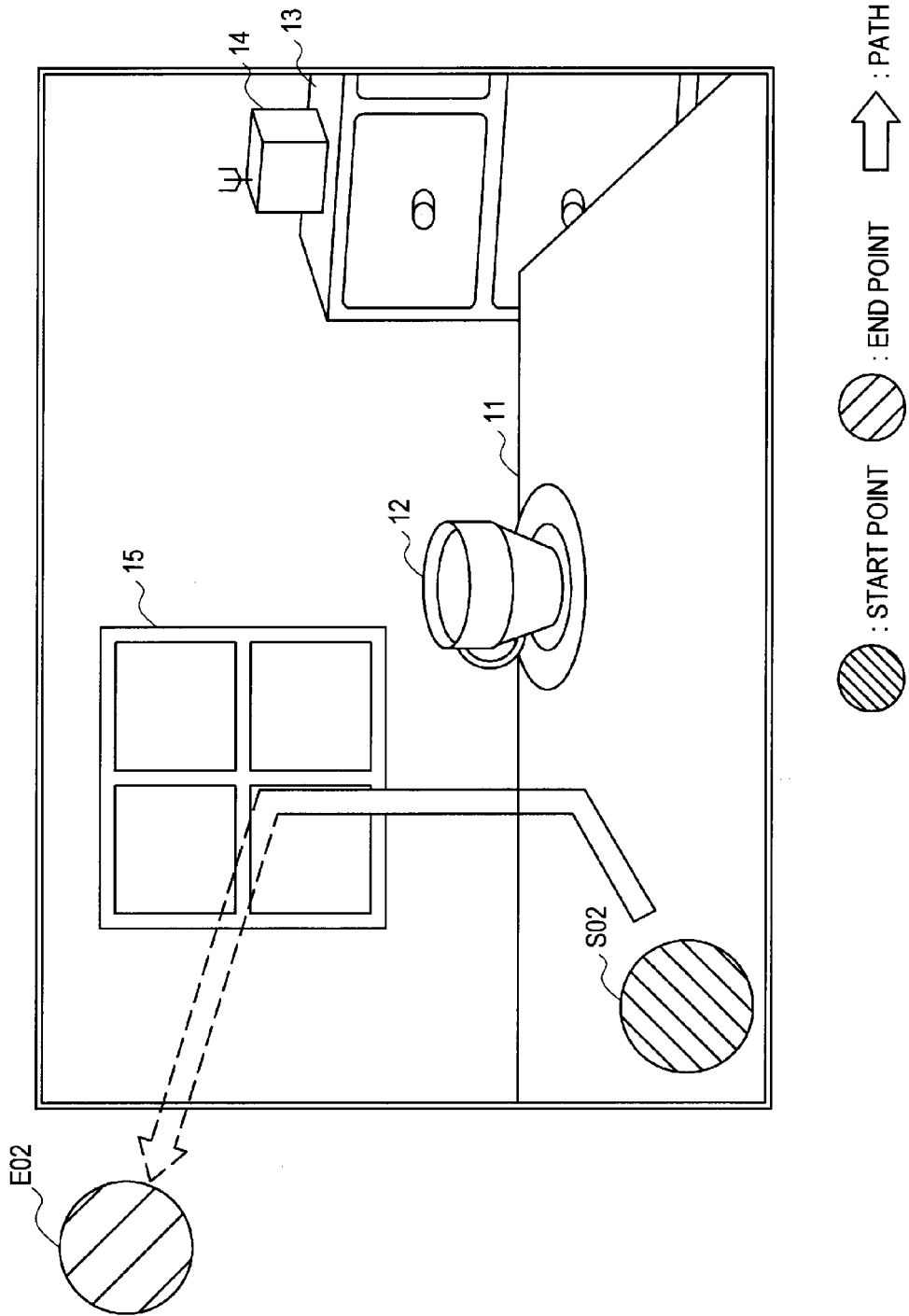

| PARAMETER | VALUE | EXAMPLE OF ANIMATION |
|---|---|---|
| COMMUNICATION RATE | HIGH | AGENT IS AIRPLANE |
| | LOW | AGENT IS PIGEON |
| RECEPTION LEVEL | HIGH | ANIMATION MOVES AT HIGH SPEED |
| | MIDDLE | ANIMATION MOVES AT MIDDLE SPEED |
| | LOW | ANIMAITON MOVES AT LOW SPEED |

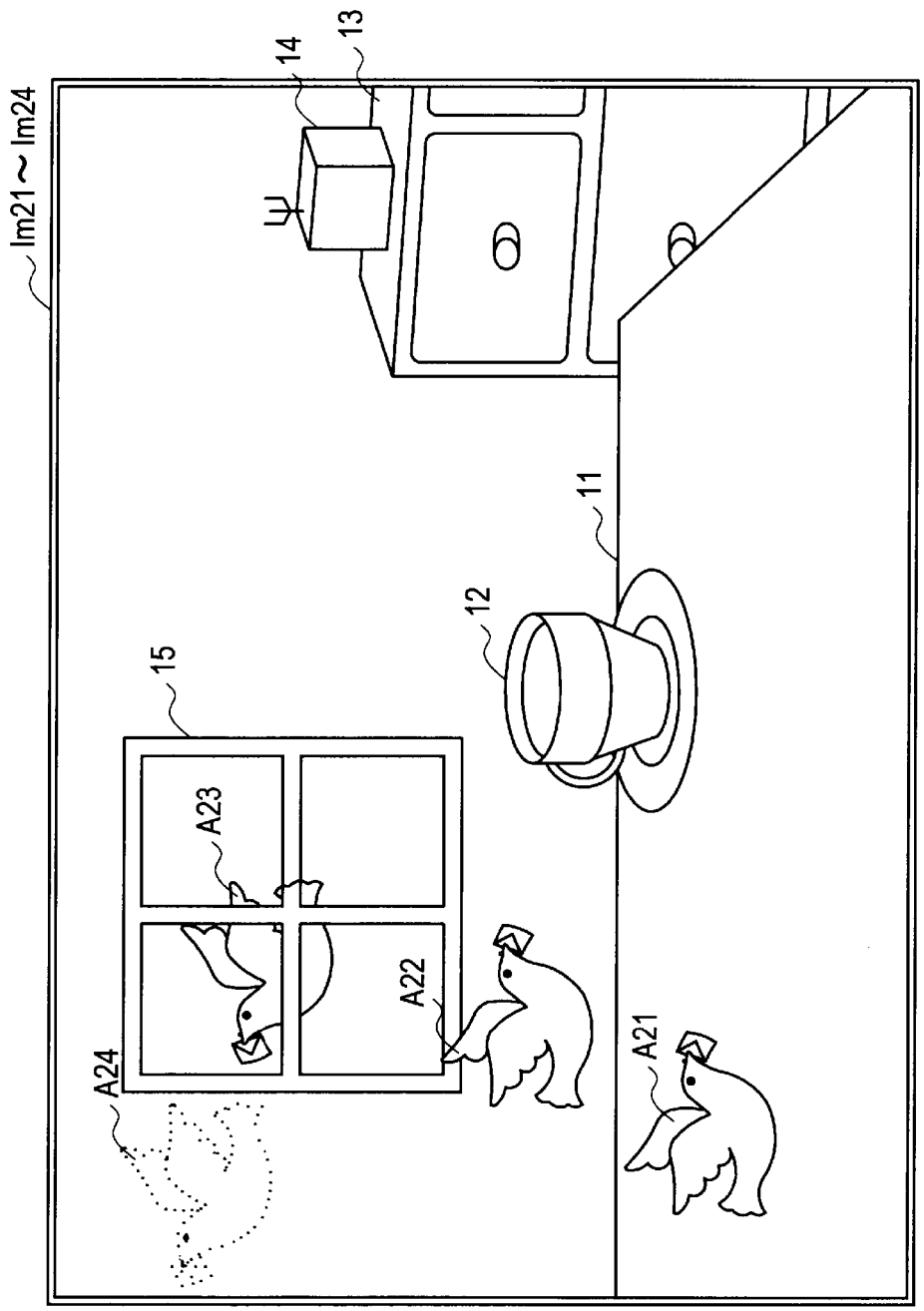

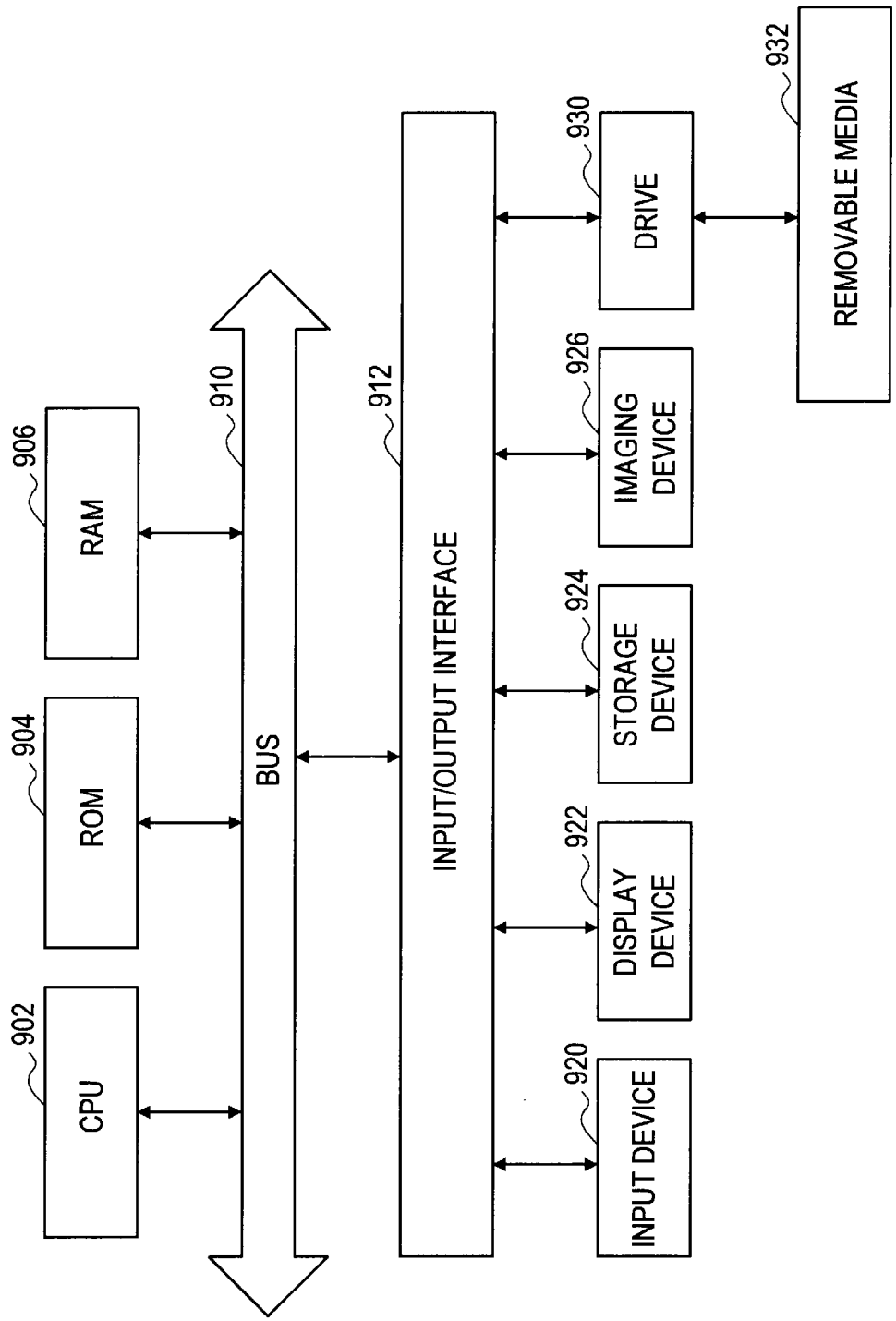

IMAGE PROCESSING DEVICE, IMAGE PROCESSING METHOD, AND PROGRAM

BACKGROUND OF THE INVENTION

1. Field of the Invention

The present invention relates to an image processing device, an image processing method, and a program.

2. Description of the Related Art

Recently, technology called augmented reality (AR) in which an image obtained by imaging a real space is processed and then presented to a user has been receiving attention. In the AR technology, useful information related to a physical object in a real space present in an input image may be inserted to generate an output image and the output image is output, for example. That is, in the AR technology, typically, a large part of the image presented to the user shows the real space, and a part of the image may be processed in accordance with a purpose. Such a characteristic contrasts it with virtual reality in which an entire (or a large part) of the output image is composed using computer graphics (CG). By using the AR technology, for example, advantages such as easy recognition of a situation of the real space by a user or operation support based on the output image may be provided.

In the AR technology, in order to present actually useful information to the user, it is important that a computer accurately recognize a situation of the real space. Therefore, technology aimed at recognizing the situation of the real space, which serves as a basis of the AR technology, has been developed. For example, Japanese Patent Application Laid-Open Publication No. 2008-304268 discloses a method of dynamically generating an environment map representing a three-dimensional position of physical objects existing in a real space by applying technology called simultaneous localization and mapping (SLAM) capable of simultaneously estimating a position and posture of a camera and a position of a feature point shown in an image of the camera. Further, a basic principle of the SLAM technology using a monocular camera is disclosed in Andrew J. Davison's, "Real-Time Simultaneous Localization and Mapping with a Single Camera," Proceedings of the 9th IEEE International Conference on Computer Vision Volume 2, 2003, pp. 1403-1410.

Recently, information communication technology has been widely used among general users and the users have used various communication means, such as cellular communication using a mobile terminal, a wired or wireless local area network (LAN) in a home network, broadband communication, and infrared communication. Further, there are a variety of communication services utilizing such communication means.

SUMMARY OF THE INVENTION

However, generally, a user is only notified of a status of communication in a communication means used by the user using images, such as simple icons, or text information on a screen. Also, in some applications, there is an example in which a virtual agent represented by, for example, the Post Pet (registered trademark) is displayed on a screen, but such an agent only operates in a virtual space closed in a screen of a terminal device.

Meanwhile, if a status of communication can be represented by displaying information as if communication involving entities in a real space is performed by applying the above-described environment map, it is expected that the status of communication can be intuitively recognized by a user and entertainment in communication can also be provided to the user.

In light of the foregoing, it is desirable to provide a novel and improved image processing device, an image processing method, and a program which capable of displaying a status of communication in a communication means used by a user as if communication involving entities in a real space is performed.

According to an embodiment of the present invention, there is provided an image processing device including: a data storage unit having feature data stored therein, the feature data indicating a feature of appearance of one or more physical objects; an environment map building unit for building an environment map based on an input image obtained by imaging a real space using an imaging device and the feature data stored in the data storage unit, the environment map representing a position of a physical object present in the real space; an information generating unit for generating animation data for displaying a status of communication via a communication interface on a screen, using the environment map built by the environment map building unit; and an image superimposing unit for generating an output image by superimposing an animation according to the animation data generated by the information generating unit on the input image.

The information generating unit may determine motion of the animation according to a position of a physical object in a real space represented by the environment map.

The information generating unit may determine a movement direction of the animation according to a position of a communication party.

The information generating unit may determine motion of the animation or a type of the animation according to a rate of the communication.

The communication may be wireless communication, and the information generating unit may determine motion of the animation or a type of the animation according to a reception level of a radio signal in the communication.

The information generating unit may change motion of the animation according to whether the communication is successful.

The information generating unit may determine motion of the animation or a type of the animation according to a type of communication service realized by the communication.

The animation may be an animation representing a virtual character.

The image processing device may further include a detection unit for dynamically detecting a position in the real space of the imaging device based on the input image and the feature data, and a position in the input image at which the animation is superimposed may be calculated according to a position in the real space of the imaging device detected by the detection unit.

According to another embodiment of the present invention, there is provided an image processing method in an image processing device including a storage medium having feature data stored therein, the feature data indicating a feature of appearance of one or more physical objects, the method including the steps of: acquiring an input image obtained by imaging a real space using an imaging device; building an environment map based on the input image and the feature data, the environment map representing a position of a physical object present in the real space; generating animation data for displaying a status of communication via a communication interface on a screen, using the environment map; and generating an output image by superimposing an animation according to the animation data on the input image.

According to another embodiment of the present invention, there is provided a program for causing a computer, which controls an image processing device including a storage medium having feature data stored therein, the feature data indicating a feature of appearance of one or more physical objects, to function as: an environment map building unit for building an environment map based on an input image obtained by imaging a real space using an imaging device and the feature data, the environment map representing a position of a physical object present in the real space; an information generating unit for generating animation data for displaying a status of communication via a communication interface on a screen, using the environment map built by the environment map building unit; and an image superimposing unit for generating an output image by superimposing an animation according to the animation data generated by the information generating unit on the input image.

As described above, according to the image processing device, the image processing method, and the program in an embodiment of the present invention, it is possible to display a status of communication in a communication means used by a user as if communication involving entities in a real space is performed.

BRIEF DESCRIPTION OF THE DRAWINGS

FIG. 11 is an illustrative diagram showing an example of correspondence between communication service and a status in each communication service;

FIG. 13 is an illustrative diagram illustrating a determination of the type of an animation by an information generating unit according to an embodiment;

FIG. 14 is an illustrative diagram illustrating a determination of a start point and an end point of an animation by an information generating unit according to an embodiment;

FIG. 15 is an illustrative diagram showing a first example of a route of an animation that can be determined by an information generating unit according to an embodiment;

FIG. 16 is an illustrative diagram showing a second example of a route of an animation that can be determined by an information generating unit according to an embodiment;

FIG. 17 is an illustrative diagram illustrating a change of an animation according to a communication rate or a reception level by an information generating unit according to an embodiment;

FIG. 19 is an illustrative diagram showing a second example of an output image output by an image processing device according to an embodiment; and FIG. 20 is a block diagram showing an example of a hardware configuration of a general-purpose computer.

DETAILED DESCRIPTION OF THE EMBODIMENT(S)

Figure 1:
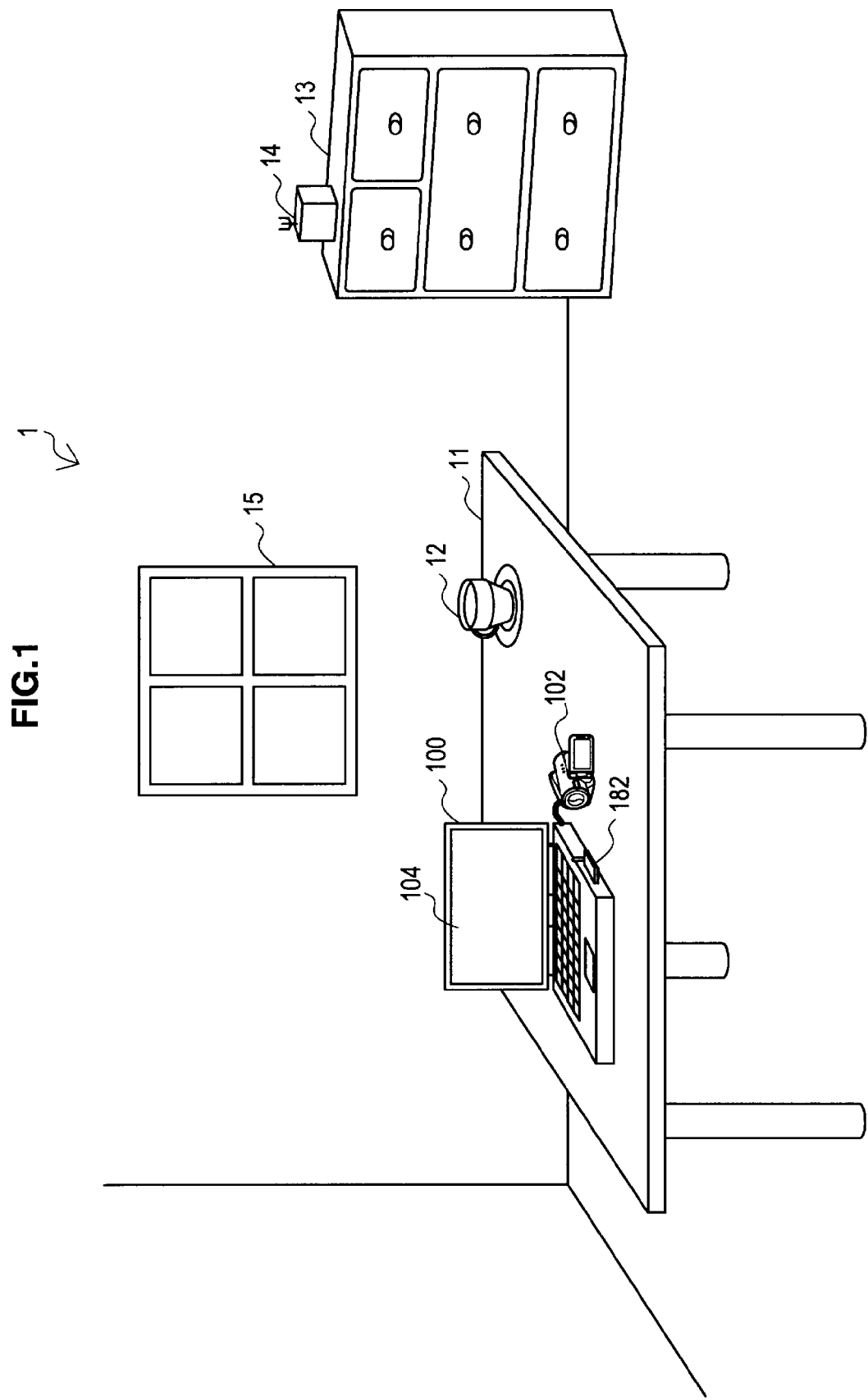
FIG. 1 is a schematic diagram illustrating an image processing device according to an embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Also, the "detailed description of the embodiment(s)" will be described in the following order.

1. Overview of Image Processing Device
2. Configuration of Image Processing Device according to Embodiment
    2-1. Imaging unit
    2-2. Environment Map Generating Unit
    2-3. Output Image Generating Unit
    2-4. Example of Output Image
3. Example of Hardware Configuration
4. Application example
5. Conclusion 1. Overview of Image Processing Device FIG. 1 is a schematic diagram for illustrating an overview of an image processing device according to an embodiment of the present invention. In FIG. 1, an environment 1 is shown as a real space where the image processing device 100 according to an embodiment of the present invention is present.

Referring to FIG. 1, a desk 11, a coffee cup 12, a dresser 13, a wireless access point (AP) 14, a window 15, and the image processing device 100 are present inside the environment 1. The desk 11 is installed on a floor as a bottom of the environment 1. The coffee cup 12 and the image processing device 100 are located on the desk 11. The dresser 13 is installed on the floor along a wall of the environment 1. The wireless AP 14 is located on the drawer 13. The window 15 is installed in the wall of the environment 1.

The image processing device 100 images such an environment 1 as an example using an imaging device 102 and acquires a set of input images. The image processing device 100 displays, using a screen 104, an output image generated by superimposing information according to an embodiment, which will be described later, on the acquired input image. The image processing device 100 further includes a communication interface 182. The above-described output image is, for example, an image for presenting a status of communication to a user via the communication interface 182.

Figure 2:
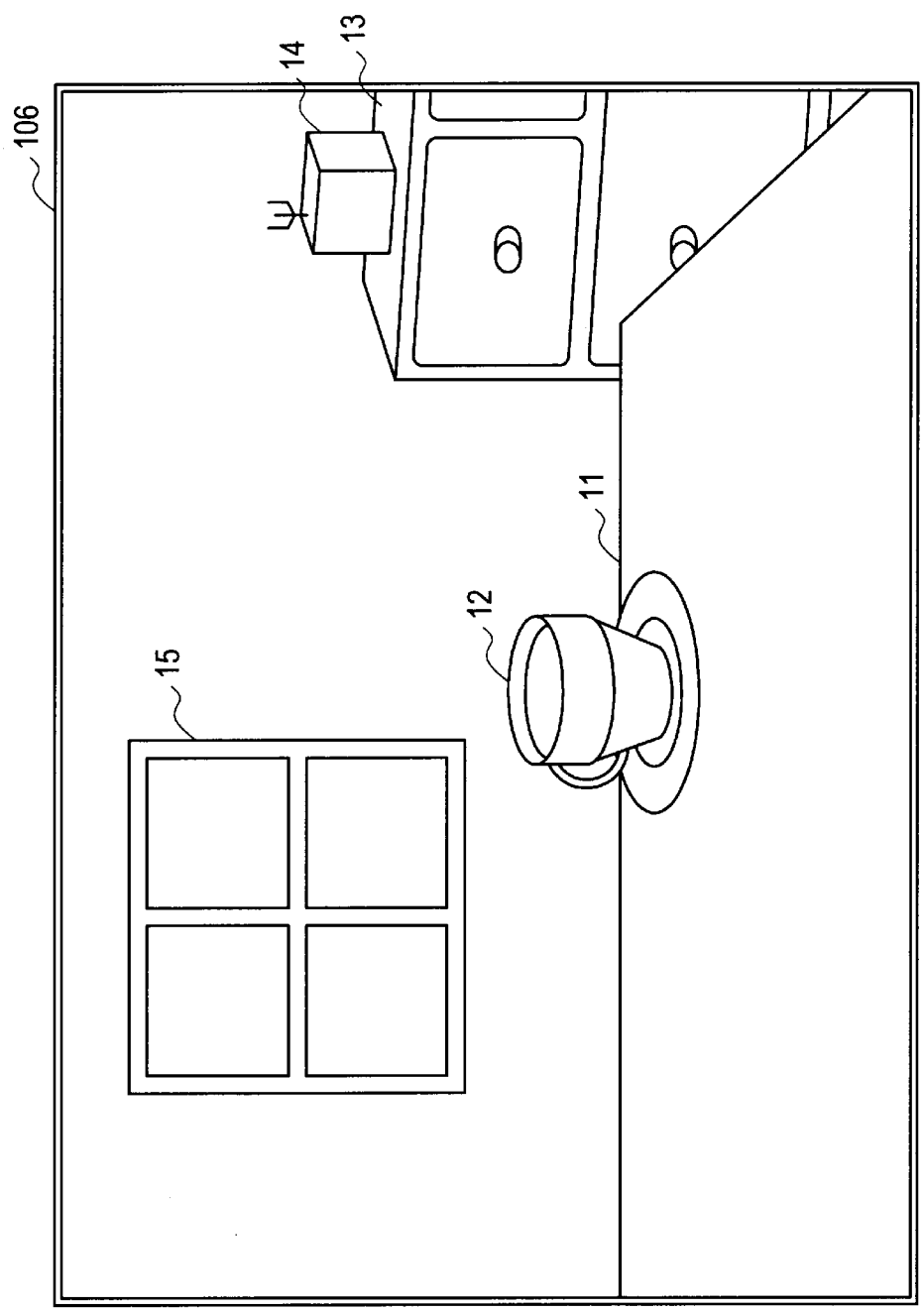
FIG. 2 is an illustrative diagram showing an example of an input image that may be acquired in an environment shown in FIG. 1.

FIG. 2 is an illustrative diagram showing an input image 106, as an example, acquired by the image processing device 100 using the imaging device 102. Referring to FIG. 2, the desk 11, the coffee cup 12, the dresser 13, the wireless AP 14, and the window 15 present inside the environment 1 shown in FIG. 1 are shown in the input image 106.

Figure 3:
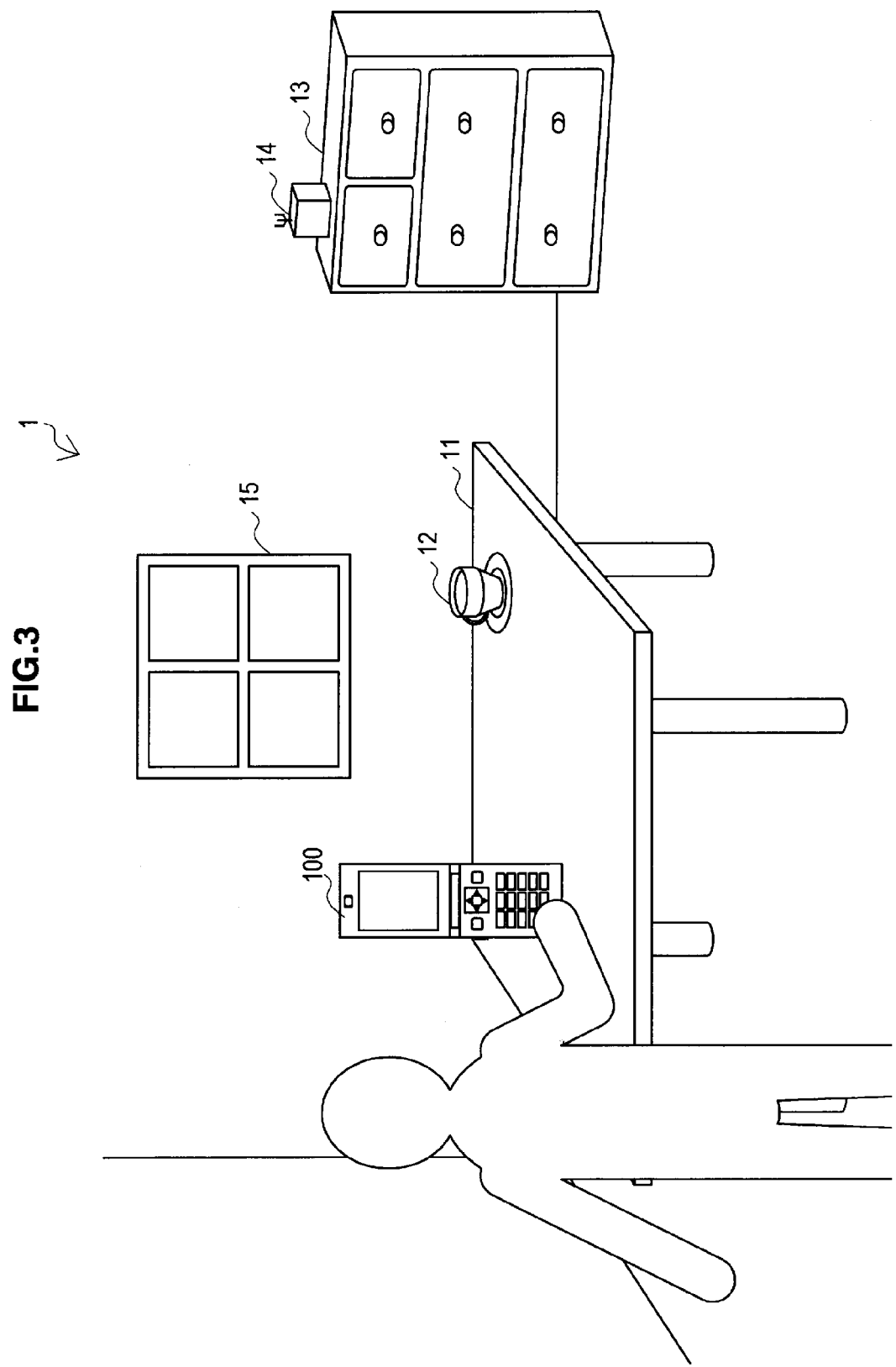
FIG. 3 is a schematic diagram illustrating another example of the image processing device.

While a personal computer (PC) is shown as an example of the image processing device 100 in FIG. 1, the image processing device 100 is not limited to such an example. For example, as shown in FIG. 3, the image processing device 100 may be a mobile phone terminal including an imaging device and a display device. Also, the image processing device 100 may have an imaging device and a display device therein, or may be externally connected to such devices. Also, the imaging device and the display device may be realized as a head mount display mounted to a head portion of a user. An example of a configuration of the image processing device 100 described in this section will be described in detail in a next section.

2. Configuration of Image Processing Device According to Embodiment

Figure 4:
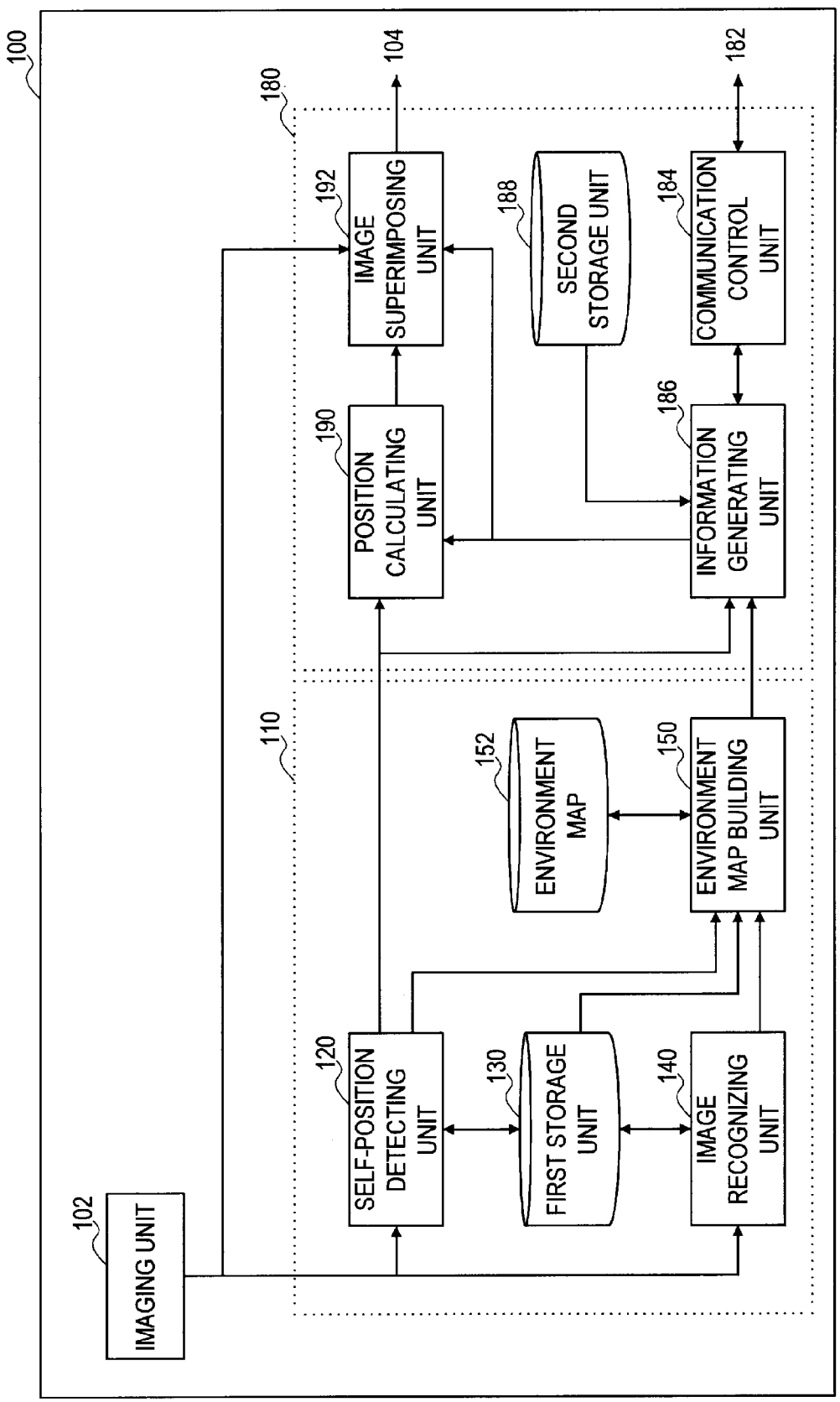
FIG. 4 is a block diagram showing an example of a configuration of an image processing device according to an embodiment.

FIG. 4 is a block diagram showing an example of a configuration of the image processing device 100 according to an embodiment of the present invention. Referring to FIG. 4, the image processing device 100 includes an imaging unit 102, an environment map generating unit 110, and an output image generating unit 180.

[2-1. Imaging Unit]

The imaging unit 102 may be realized as an imaging device having an imaging element such as a charge coupled device (CCD) or a complementary metal oxide semiconductor (CMOS), for example. The imaging unit 102 may be provided outside the image processing device 100. The imaging unit 102 outputs an image acquired by imaging the real space such as the environment 1 illustrated in FIG. 1 to the environment map generating unit 110 and the output image generating unit 180 as the input image.

[2-2. Environment Map Generating Unit]

The environment map generating unit 110 generates an environment map representing, for example, positions of one or more physical objects present in the real space based on the input image input from the imaging unit 102 and feature data of an object, which will be described later, stored in a first storage unit 130. As shown in FIG. 4, in this embodiment, the environment map generating unit 110 includes a self-position detecting unit 120, the first storage unit 130, an image recognizing unit 140, an environment map building unit 150 and an environment map storage unit 152.

(1) Self-Position Detection Unit

The self-position detecting unit 120 dynamically detects a position of the imaging device, which images the input image, based on the input image input from the imaging unit 102 and the feature data stored in the first storage unit 130. For example, even in a case in which the imaging device has a monocular camera, the self-position detecting unit 120 may dynamically determine a position and posture of the camera and a position of a feature point (FP) on an imaging plane of the camera for each frame by applying the SLAM technology disclosed in Andrew J. Davison's "Real-Time Simultaneous Localization and Mapping with a Single Camera," Proceedings of the 9th IEEE International Conference on Computer Vision Volume 2, 2003, pp. 1403-1410.

First, entire flow of a self-position detection process in the self-position detecting unit 120 to which the SLAM technology is applied will be described with reference to FIG. 5. Next, the self-position detection process will be described in detail with reference to FIGS. 6 to 8.

Figure 5:
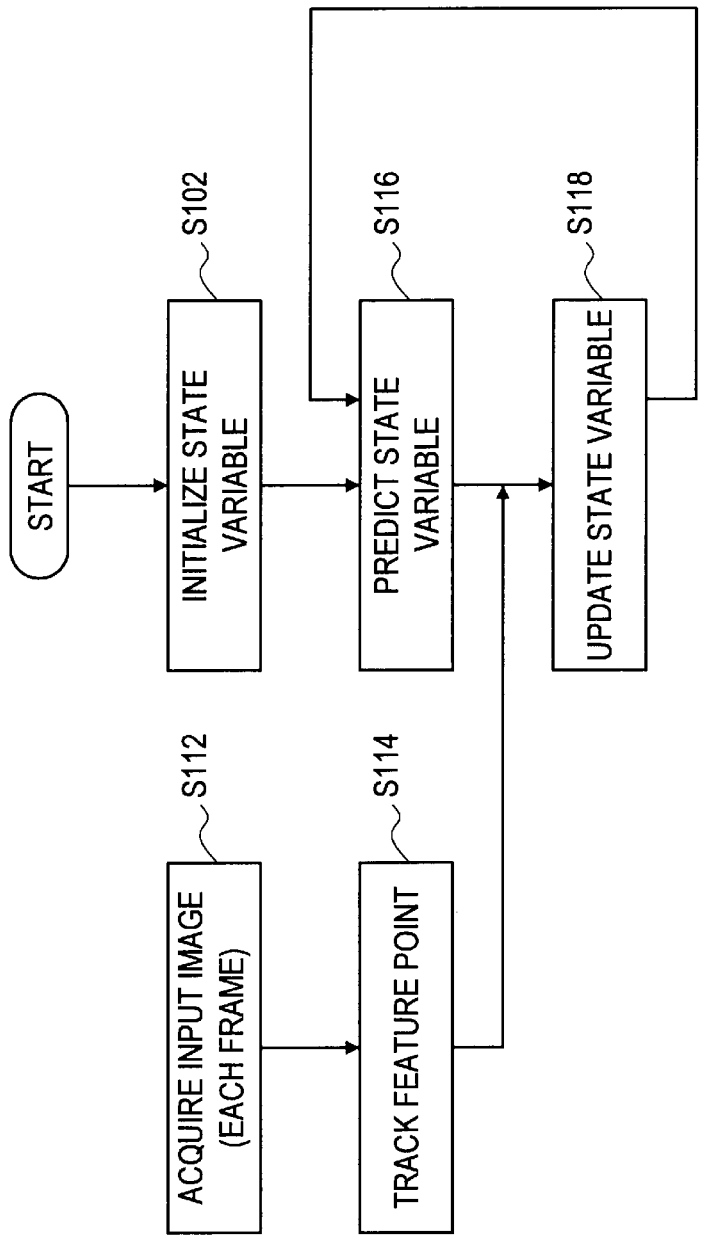
FIG. 5 is a flowchart showing an example of flow of a self-position detection process according to an embodiment.

FIG. 5 is a flowchart showing an example of the flow of the self-position detection process in the self-position detecting unit 120 to which the SLAM technology is applied. In FIG. 5, when the self-position detection process starts, the self-position detecting unit 120 first initializes a state variable (step S102). In this embodiment, the state variable is a vector including the position and the posture (rotation angle) of the camera, a moving speed and an angular speed of the camera and the position of one or more FPs as elements. The self-position detecting unit 120 sequentially acquires the input image from the imaging unit 102 (step S112). The process from step S112 to step S118 may be repeated for each input image (i.e., each frame).

In step S114, the self-position detecting unit 120 tracks FPs present in the input image. For example, the self-position detecting unit 120 detects a patch (small image of 3×3=9 pixels around a FP, for example) of each FP stored in advance in the first storage unit 130 from the input image. The position of the patch detected herein, that is, the position of the FP, is used to update the state variable later.

In step S116, the self-position detecting unit 120 generates, for example, a predicted value of the state variable of a next frame based on a given prediction model. Also, in step S118, the self-position detecting unit 120 updates the state variable using the predicted value of the state variable generated in step S116 and an observed value according to the position of the FP detected in step S114. The self-position detecting unit 120 executes the process in steps S116 and S118 based on a principle of an extended Kalman filter.

As a result of such a process, a value of the state variable updated for each frame is output. Hereinafter, contents of respective processes of tracking the FP (step S114), prediction of the state variable (step S116) and updating the state variable (step S118) will be described more specifically.

(1-1) Tracking of FP

In this embodiment, the first storage unit 130 stores the feature data indicating features of objects corresponding to physical objects which may be present in the real space, in advance. The feature data includes small images, that is, the patches regarding one or more FPs, each representing the feature of appearance of each object, for example. The patch may be the small image composed of 3×3=9 pixels around the FP, for example.

Figure 6:
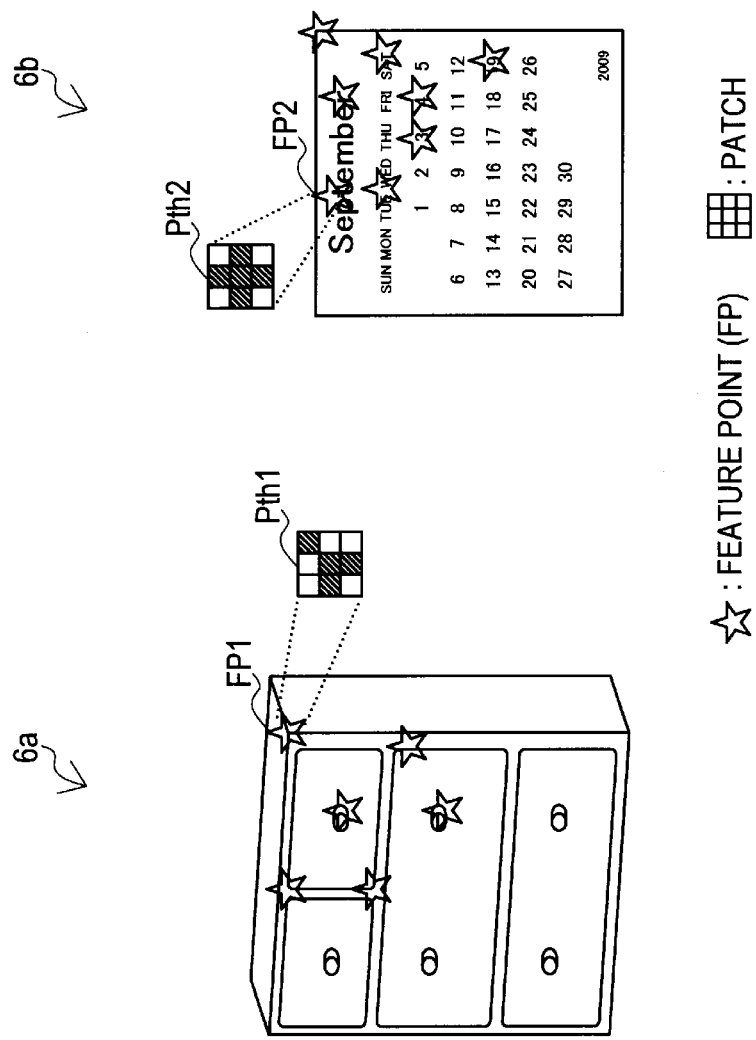
FIG. 6 is an illustrative diagram illustrating a feature point set on an object.
Figure 7:
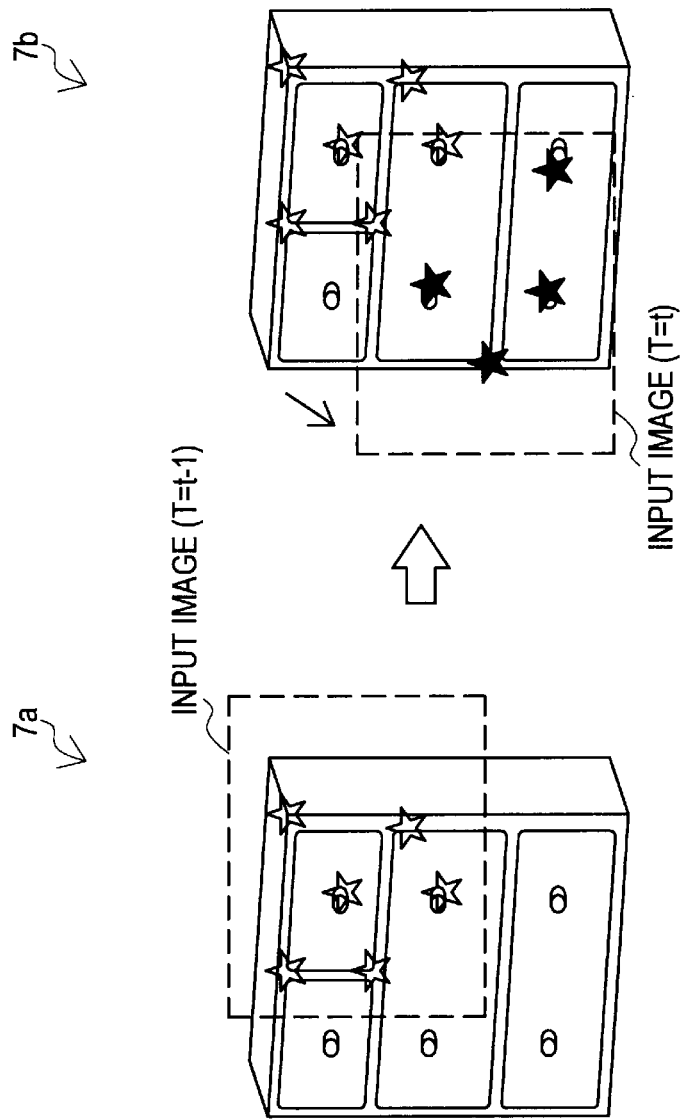
FIG. 7 is an illustrative diagram illustrating addition of the feature point.

FIG. 6 shows two examples of the objects and an example of FPs and patches set on each object. A left object in FIG. 6 is the object representing a dresser (see FIG. 6a). A plurality of FPs including a feature point FP1 are set on the object. Further, a patch Pth1 is defined to be associated with the feature point FP1. On the other hand, a right object in FIG. 6 is the object representing a calendar (see FIG. 6b). A plurality of FPs including a feature point FP2 are set on the object. Further, a patch Pth2 is defined to be associated with the feature point FP2.

When the input image is acquired from the imaging unit 102, the self-position detecting unit 120 matches partial images included in the input image against the patch for each FP illustrated in FIG. 6 stored in advance in the first storage unit 130. The self-position detecting unit 120 then specifies a position of each FP included in the input image (a position of a center pixel of the detected patch, for example) as the result of matching.

Further, in tracking of the FPs (step S114 in FIG. 5), data regarding all the FPs to be tracked may not be stored in the first storage unit 130 in advance. For example, six FPs are detected in the input image at time T=t−1 in an example of FIG. 7 (see FIG. 7a). Next, when the position or the posture of the camera changes at time T=t, only two of the six FPs present in the input image at the time T=t−1 are present in the input image. In this case, the self-position detecting unit 120 may newly set FPs in positions where a characteristic pixel pattern of the input image is present and use the new FPs in the self-position detection process for a subsequent frame. For example, in the example shown in FIG. 7, four new FPs are set on the object at the time T=t (see FIG. 7b). This is a characteristic of the SLAM technology, and accordingly, a cost of setting all of the FPs in advance can be reduced and accuracy of the process can be improved using a number of added FPs.

(1-2) Prediction of State Variable

In this embodiment, the self-position detecting unit 120 uses a state variable X shown in the following equation as the state variable to be applied with the extended Kalman filter.

[Equation 1]

$$X = \begin{pmatrix} x \\ \omega \\ \dot{x} \\ \dot{\omega} \\ p_1 \\ \vdots \\ p_N \end{pmatrix} \quad (1)$$

The first element of the state variable X in Equation (1) represents a three-dimensional position of the camera in a global coordinate system (x, y, z) being a coordinate system set in the real space, as in the following equation.

[Equation 2]

$$x = \begin{pmatrix} x_c \\ y_c \\ z_c \end{pmatrix} \quad (2)$$

Also, the second element of the state variable is a four-dimensional vector ω having a quaternion as an element corresponding to a rotation matrix representing the posture of the camera. The posture of the camera may be represented using an Euler angle in place of the quaternion. Also, the third and the fourth elements of the state variable represent the moving speed and the angular speed of the camera, respectively.

Further, the fifth and subsequent elements of the state variable represent a three-dimensional position $p_i$ of a feature point $FP_i$ (i=1 ... N) in the global coordinate system as shown in the following equation. Further, as described above, the number N of the FPs may change during the process.

[Equation 3]

$$p_i = \begin{pmatrix} x_i \\ y_i \\ z_i \end{pmatrix} \quad (3)$$

The self-position detecting unit 120 generates the predicted value of the state variable for a latest frame based on the value of the state variable X initialized in step S102 or the value of the state variable X updated in a previous frame. The predicted value of the state variable is generated according to a state equation of the extended Kalman filter according to multi-dimensional normal distribution shown in the following equation.

[Equation 4]

$$\text{predicted state variable } \hat{X}=F(X,a)+w \quad (4)$$

Here, F denotes the prediction model regarding state transition of a system. a denotes a prediction condition. Also, w denotes Gaussian noise and may include a model approximation error, an observation error and the like, for example. In general, an average of the Gaussian noise w is 0.

Figure 8:
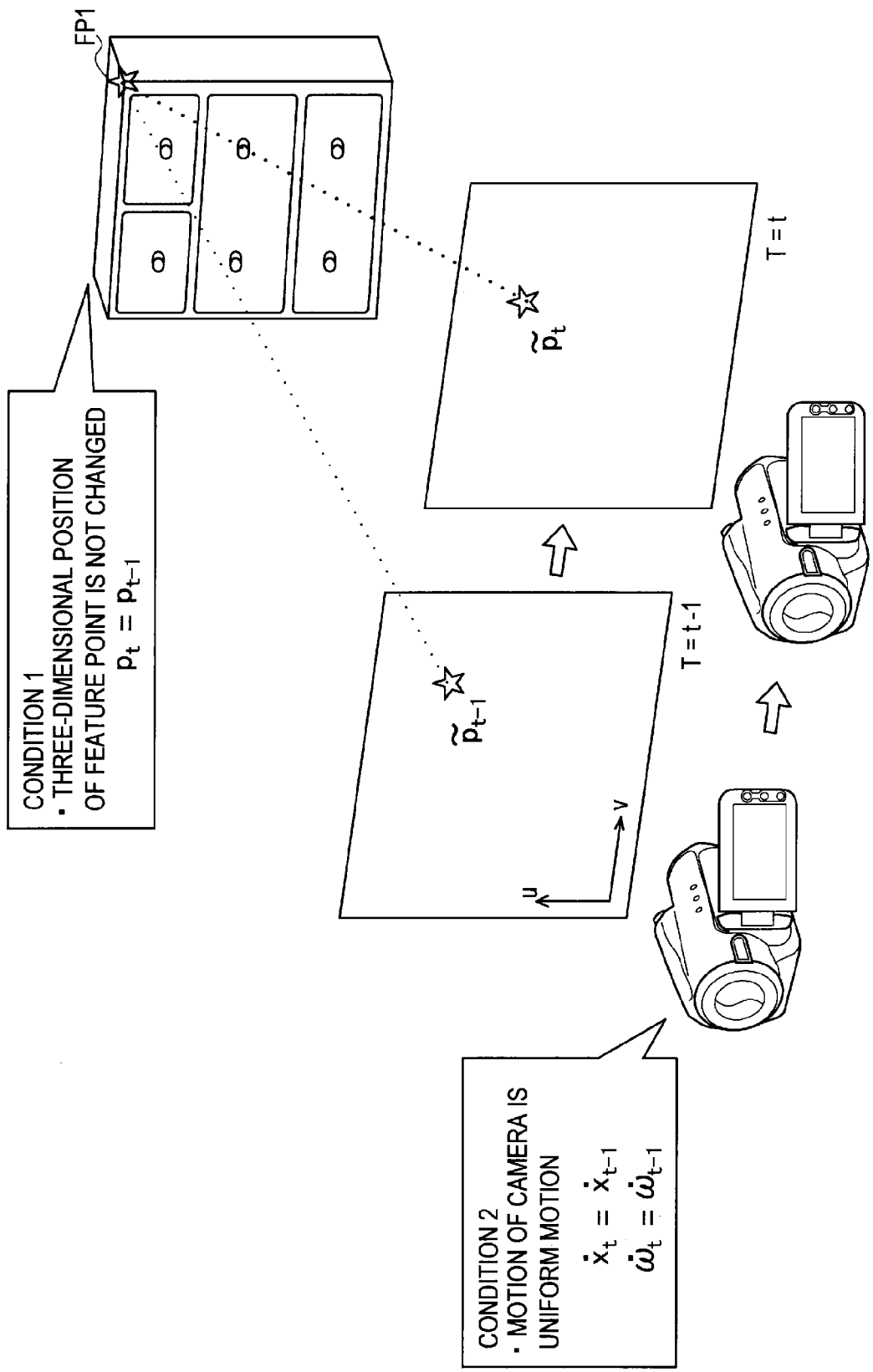
FIG. 8 is an illustrative diagram illustrating an example of a prediction model.

FIG. 8 is an illustrative diagram for illustrating an example of the prediction model according to this embodiment. Referring to FIG. 8, two prediction conditions in the prediction model according to this embodiment are shown. First, as a first condition, it is assumed that the three-dimensional position of the FP in the global coordinate system does not change. That is, provided that the three-dimensional position of the feature point FP1 at the time T is $p_T$, the following relationship is satisfied.

[Equation 5]

$$p_t = p_{t-1} \quad (5)$$

Next, as a second condition, it is assumed that motion of the camera is uniform motion. That is, the following relationship is satisfied for the speed and the angular speed of the camera from the time T=t−1 to the time T=t.

[Equation 6]

$$\dot{x}_t = \dot{x}_{t-1} \quad (6)$$

$$\dot{\omega}_t = \dot{\omega}_{t-1} \quad (7)$$

The self-position detecting unit 120 generates the predicted value of the state variable for the latest frame based on such a prediction model and the state equation shown in Equation (4).

(1-3) Updating of State Variable

The self-position detecting unit 120 evaluates an error between observation information predicted from the predicted value of the state variable and actual observation information obtained as a result of FP tracking, using an observation equation, for example. Further, v in Equation (8) is the error.

[Equation 7]

$$\text{observation information } s=H(\hat{X})+v \quad (8)$$

$$\text{predicted observation information } \hat{s}=H(\hat{X}) \quad (9)$$

Here, H denotes an observation model. For example, a position of the feature point $FP_i$ on the imaging plane (u-v plane) is defined as in the following equation.

[Equation 8]

$$\text{position of } FP_i \text{ on imaging plane } \tilde{p}_i = \begin{pmatrix} u_i \\ v_i \\ 1 \end{pmatrix} \quad (10)$$

Here, all of the position of the camera x, the posture of the camera ω and the three-dimensional position $p_i$ of the feature point $FP_i$ are given as the elements of the state variable X. Then, the position of the feature point $FP_i$ on the imaging plane is derived using the following equation according to a pinhole model.

[Equation 9]

$$\lambda \hat{p}_i = AR_\omega(p_i - x) \quad (11)$$

Here, λ denotes a parameter for normalization, A denotes a camera internal parameter, and $R_\omega$ denotes the rotation matrix corresponding to the quaternion ω representing the posture of the camera included in the state variable X. The camera internal parameter A is given in advance as in the following equation according to characteristics of the imaging device, which images the input image.

[Equation 10]

$$A = \begin{pmatrix} -f \cdot k_u & f \cdot k_u \cdot \cot\theta & u_O \\ 0 & -\dfrac{f \cdot k_v}{\sin\theta} & v_O \\ 0 & 0 & 1 \end{pmatrix} \quad (12)$$

Here, f denotes a focal distance, θ denotes orthogonality of an image axis (ideal value is 90 degrees), $k_u$ denotes a scale along a vertical axis of the imaging plane (rate of change of scale from the global coordinate system to the coordinate system of the imaging plane), $k_v$ denotes a scale along a horizontal axis of the imaging plane, and $(u_o, v_o)$ denotes a center position of the imaging plane.

Therefore, a feasible latest state variable X may be obtained by searching for the state variable X, which minimizes the error between the predicted observation information derived using Equation (11), that is, the position of each FP on the imaging plane and the result of FP tracking in step S114 in FIG. 5.

[Equation 11]

$$\text{latest state variable } X \leftarrow \hat{X} + \text{Innov}(s - \hat{s}) \quad (13)$$

The self-position detecting unit 120 outputs the position x and the posture ω of the camera (imaging device) dynamically updated by applying the SLAM technology in this manner to the environment map building unit 150 and the output image generating unit 180.

(2) First Storage Unit

Figure 9:
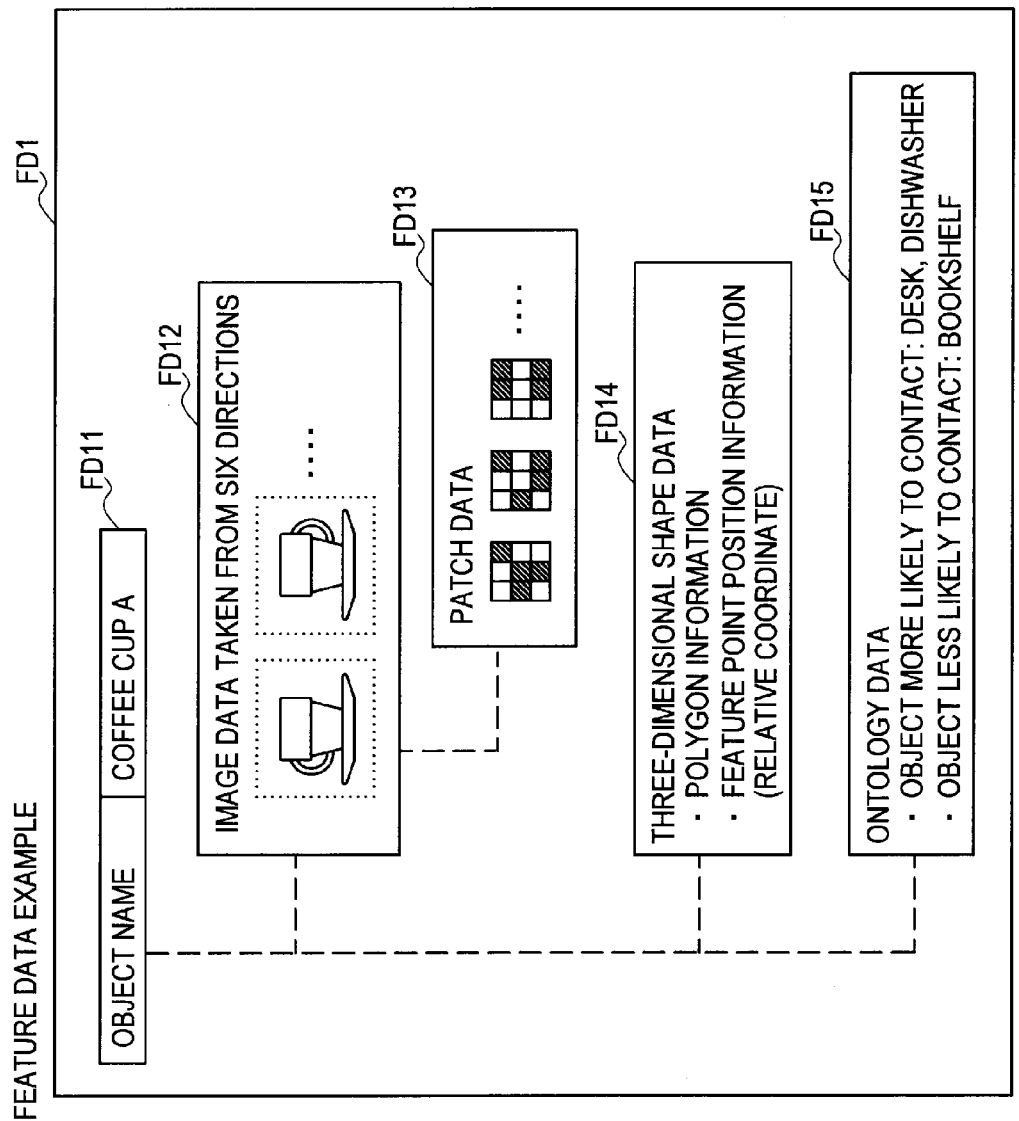
FIG. 9 is an illustrative diagram illustrating an example of a configuration of feature data.

The first storage unit 130 stores in advance the feature data indicating the feature of the object corresponding to the physical object, which may be present in the real space, using a storage medium such as a hard disk or a semiconductor memory. Although an example in which the first storage unit 130 is a part of the environment map generating unit 110 is shown in FIG. 4, the present invention is not limited to such an example, and the first storage unit 130 may be provided outside the environment map generating unit 110. FIG. 9 is an illustrative diagram illustrating an example of a configuration of the feature data.

Referring to FIG. 9, feature data FD1 is shown as an example for the object Obj1. The feature data FD1 includes an object name FD11, image data FD12 imaged from six directions, patch data FD13, three-dimensional shape data FD14 and ontology data FD15.

The object name FD11 is the name by which a corresponding object may be specified such as a "coffee cup A."

The image data FD12 includes six image data obtained by imaging a corresponding object from six directions: front, back, left, right, above and below, for example. The patch data FD13 is a set of small images around each FP for each of one or more FPs set on each object. The image data FD12 and the patch data FD13 may be used for an object recognition process in the image recognizing unit 140, which will be described later. Also, the patch data FD13 may be used for the above-described self-position detection process in the self-position detecting unit 120.

The three-dimensional shape data FD14 includes polygon information for recognizing a shape of the corresponding object and three-dimensional positional information of FPs. The three-dimensional shape data FD14 may be used for an environment map building process in the environment map building unit 150, which will be described later.

The ontology data FD15 is the data that may be used to support the environment map building process in the environment map building unit 150, for example. In the example of FIG. 9, the ontology data FD15 indicates that the object Obj1, which is the coffee cup, is more likely to come in contact with an object corresponding to a desk or a dishwasher and is less likely to come in contact with an object corresponding to a bookshelf.

(3) Image Recognizing Unit

The image recognizing unit 140 specifies objects to which physical objects present in the input image correspond, using the above-described feature data stored in the first storage unit 130.

Figure 10:
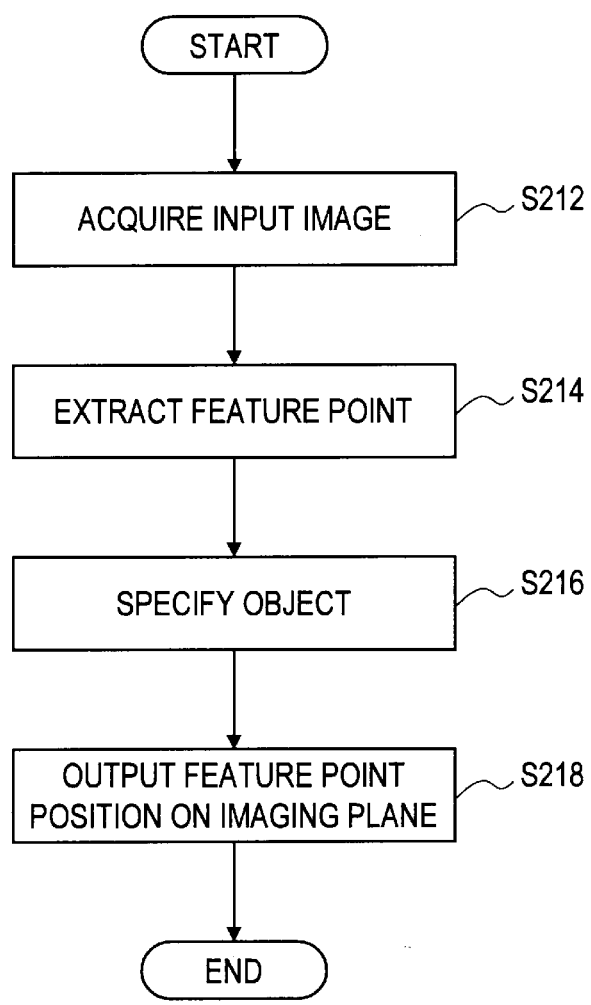
FIG. 10 is a flowchart showing an example of flow of an object recognition process according to an embodiment.

FIG. 10 is a flowchart showing an example of flow of the object recognition process in the image recognizing unit 140. Referring to FIG. 10, first, the image recognizing unit 140 acquires the input image from the imaging unit 102 (step S212). Next, the image recognizing unit 140 matches partial images included in the input image against patches of one or more FPs of each object included in the feature data to extract FPs included in the input image (step S214). The FPs used in the object recognition process in the image recognizing unit 140 and the FPs used in the self-position detection process in the self-position detecting unit 120 are not necessarily the same. However, when common FPs are used in the both processes, the image recognizing unit 140 may reuse the result of FP tracking by the self-position detecting unit 120.

Next, the image recognizing unit 140 specifies the object present in the input image based on the result of extracting the FP (step S216). For example, when the FPs belonging to one object are extracted with high density in a certain area, the image recognizing unit 140 may recognize that the object is present in the area. The image recognizing unit 140 outputs the object name (or an identifier) of the specified object and the position of the FP belonging to the object on the imaging plane to the environment map building unit 150 (step S218).

(4) Environment Map Building Unit

The environment map building unit 150 builds the environment map using the position and the posture of the camera input from the self-position detecting unit 120, the positions of the FPs on the imaging plane input from the image recognizing unit 140, and the feature data stored in the first storage unit 130. In this disclosure, the environment map is a set of data indicating positions (and postures) of one or more objects present in the real space. The environment map may include object names corresponding to objects, the three-dimensional positions of FPs belonging to objects and the polygon information forming shapes of objects, for example. The environment map may be built by obtaining the three-dimensional position of each FP according to the above-described pinhole model from the position of the FP on the imaging plane input from the image recognizing unit 140, for example.

By changing the relation equation of the pinhole model shown in Equation (11), the three-dimensional position $p_i$ of the feature point $FP_i$ in the global coordinate system may be obtained by the following equation.

[Equation 12]

$$p_i = x + \lambda \cdot R_\omega^T \cdot A^{-1} \cdot \tilde{p}_i = x + d \cdot R_\omega^T \frac{A^{-1} \cdot \tilde{p}_i}{\|A^{-1} \cdot \tilde{p}_i\|} \tag{14}$$

Here, d denotes a distance between the camera and each FP in the global coordinate system. The environment map building unit 150 may calculate such a distance d based on the positions of at least four FPs on the imaging plane and the distance between the FPs for each object. The distance between the FPs is stored in advance in the first storage unit 130 as the three-dimensional shape data FD14 included in the feature data described with reference to FIG. 9. Further, a process of calculating the distance d in Equation (14) is disclosed in detail in Japanese Patent Application Laid-Open Publication No. 2008-304268.

After the distance d is calculated, remaining variables of a right side of Equation (14) are the position and the posture of the camera input from the self-position detecting unit 120 and the position of the FP on the imaging plane input from the image recognizing unit 140, all of which are known. The environment map building unit 150 then calculates the three-dimensional position in the global coordinate system for each FP input from the image recognizing unit 140 according to Equation (14). The environment map building unit 150 builds a latest environment map according to the three-dimensional position of each calculated FP and allows the environment map storage unit 152 to store the built environment map. Further, in this case, the environment map building unit 150 can improve accuracy of the data of the environment map using the ontology data FD15 included in the feature data described with reference to FIG. 9.

The environment map storage unit 152 stores an environment map built by the environment map building unit 150, using a storage medium such as a hard disk or a semiconductor memory.

[2-3. Output Image Generating Unit]

The output image generating unit 180 generates an output image for presenting a status of communication in a communication means of the image processing device 100 to the user, using the environment map generated by the environment map generating unit 110, and displays the generated output image on the screen 104. As shown in FIG. 4, in the present embodiment, the output image generating unit 180 includes a communication control unit 184, an information generating unit 186, a second storage unit 188, a position calculating unit 190, and an image superimposing unit 192.

(1) Communication Control Unit

The communication control unit 184 controls communication of the image processing device 100 with another communication device via a communication interface. The communication control unit 184 outputs the status of the communication with the other communication device to the information generating unit 186. The communication controlled by the communication control unit 184 may be communication for any type of communication service.

FIG. 11 is an illustrative diagram showing an example of correspondence between a communication service that can be treated in the image processing device 100 and a status of the communication in each communication service. Five communication services are listed in a left side of FIG. 11 and an example of statuses corresponding to the respective services is shown in a right side. For example, the communication services that can be treated in the image processing device 100 include application services such as an electronic mail, a short message service (SMS), and voice over IP (VoIP). The communication control unit 184 may output, for example, statuses such as "transmitting a mail", "receiving a mail", "transmission (reception) completed", and "transmission (reception) failed" as communication statuses for the electronic mail. Also, the communication control unit 184 may output, for example, statuses such as "transmitting a message", "transmission completed", and "transmission failed" as communication statuses for the SMS. Also, the communication control unit 184 may output, for example, statuses such as calling and busy as communication statuses for the VoIP. Also, for example, the communication services that can be treated in the image processing device 100 include middleware services such as wireless access (connection with a wireless AP), and infrared data association (IrDA) communication. The communication control unit 184 may output, for example, statuses such as attempting to access and connecting, as communication statuses for the wireless access. Also, the communication control unit 184 may output, for example, statuses such as attempting to access and data communication, as communication statuses for the IrDA communication. In this disclosure, an example in which the communication control unit 184 mainly treats communication statuses for the electronic mail and the wireless access will be described hereinafter. However, it is understood that the present invention may be applied to other types of communication services.

In the present embodiment, when the communication control unit 184 outputs the status of the communication via the communication interface to the information generating unit 186, the communication control unit 184 also outputs a parameter related to each status to the information generating unit 186. For example, the parameters output from the communication control unit 184 to the information generating unit 186 may include identification data for identifying a communication party, a communication rate, a reception level of the radio signal (in the case of wireless communication), and the like. The identification data for identifying a communication party may be, for example, a destination (or source) address of an electronic mail, a nickname of SMS, an AP identifier of the wireless AP, or an IP address or a MAC address of the communication party.

Only one communication control unit 184 is shown in FIG. 4. Such a communication control unit 184 may treat statuses for a plurality of types of communication services in an integrated way. Alternatively, a plurality of communication control units 184 may be provided for each type of communication service.

(2) Information Generating Unit

The information generating unit 186 generates animation data for displaying the communication status input from the communication control unit 184 on a screen, using the environment map acquired from the environment map generating unit 110 and the position of the imaging device.

In the present embodiment, the animation data generated by the information generating unit 186 may be a three-dimensional animation indicating the communication status, which is associated with the environment map. Alternatively, the animation data may be, for example, a control parameter for controlling the animation to be displayed (information designating the type, position, motion and the like of the animation).

Figure 12:
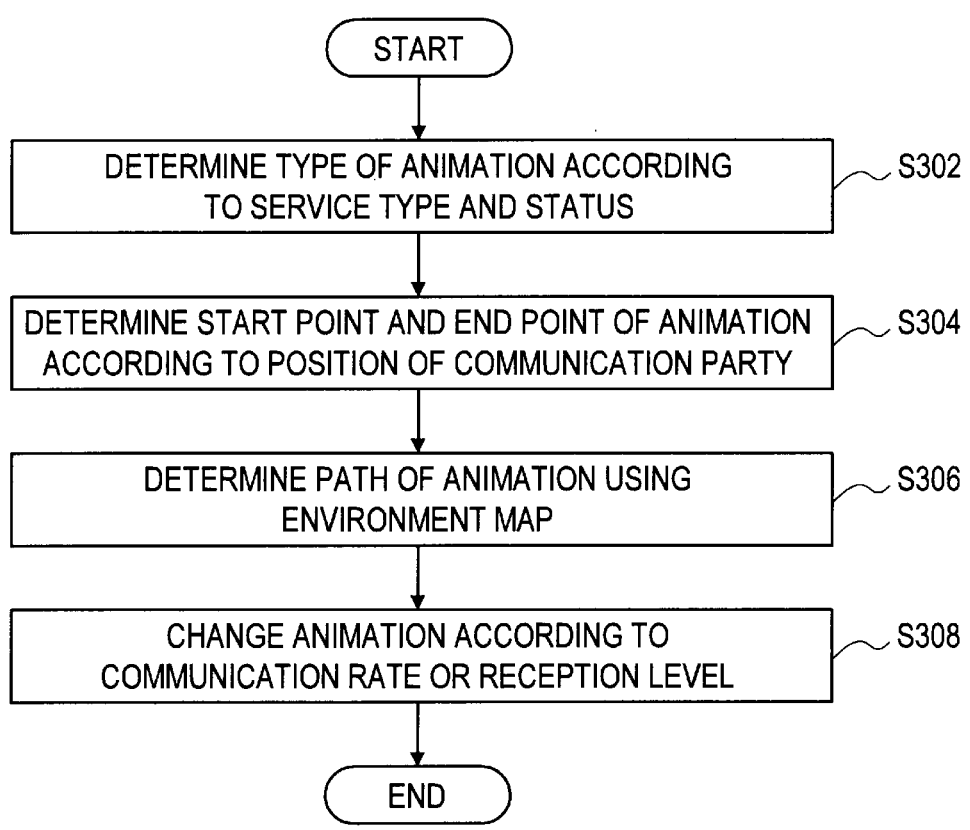
FIG. 12 is a flowchart illustrating an example of flow of an animation data generation process according to an embodiment.

FIG. 12 is a flowchart showing an example of flow of an animation data generation process according to the present embodiment. Hereinafter, the flow of the animation data generation process illustrated in FIG. 12 will be described with reference to FIGS. 13 to 17.

First, the information generating unit 186 determines the type of the animation according to the communication status input from the communication control unit 184 and the type of the communication service (step S302). FIG. 13 shows a data example of a status-animation correspondence table 188a stored in the second storage unit 188 in advance. Referring to FIG. 13, for example, the information generating unit 186 determines that an animation is to be generated in the form of an agent going out, when the service type of the communication service is an electronic mail and the status is "transmitting a mail." The agent refers to a virtual character such as an animal, a person, or a physical object for representing the status. When the service type is an electronic mail, the information generating unit 186 determines that the animation is to be generated in the form of the agent coming in if the status indicates "receiving a mail," of the agent reaching the end point if the status indicates "completed", and of the agent going back if the status indicates "failed." Also, when the service type is the wireless access, the information generating unit 186 determines that the animation is to be generated in the form of an arrow extending to the wireless AP if the status indicates "attempting to access," and of a cable being connected to the wireless AP if the status indicates "connecting." The type of the animation is only an example.

Next, the information generating unit 186 determines the start point and the end point of the animation (i.e., the movement direction of the animation) according to the position of the communication party (step S304). The start point and the end point of the animation refer to a position in the environment map at which the motion of the animation is initiated, and a position in the environment map serving as a destination of the motion of the animation, respectively. FIG. 14 shows a data example of a start point and end point determination table 188b stored in the second storage unit 188 in advance. For example, in the start point and end point determination table 188b, communication parties of the electronic mail are classified into a registered user and a non-registered user. The registered user refers to, for example, a friend user of the user of the image processing device 100, i.e., a user whose mail address and position in the real space are registered in the second storage unit 188 in advance. The position of the registered user in the real space may not necessarily be a position at which the user is actually present. For example, any position, such as a position of a room for a family, a position of an office for a colleague in a company, and a position of a home for a friend may be registered by the user of the image processing device 100 in advance. Referring to the start point and end point determination table 188b, when the electronic mail is transmitted to the registered user, the start point of the animation is a self-position (the position of the imaging device) and the end point is the position of (the registered user), which has been registered in advance. Also, when an electronic mail is received from the registered user, the start point of the animation is the position registered in advance and the end point is the self-position. Also, when an electronic mail is transmitted to the non-registered user, the start point of the animation is the self-position and the end point is a position of the window in the environment map. Also, when an electronic mail is received from the non-registered user, the start point of the animation is the position of the window in the environment map, and the end point is the self-position. Further, when the wireless access is performed, the communication party is the wireless AP, the start point of the animation is the self-position, and the end point is the position of the wireless AP in the environment map. Further, when the wireless access is performed, a position of the communication interface 182 that may be registered in advance may be defined as the start point of the animation, instead of the self-position as the position of the imaging device. The information generating unit 186 determines the start point and the end point of the animation according to the position of the communication party by referring to such a start point and end point determination table 188b.

Next, the information generating unit 186 determines a route of the animation connecting the start point with the end point determined in step S304, using the environment map (step S306). For example, the information generating unit 186 may determine a route of avoiding an obstacle present in the environment map, as the route of the animation. Also, for example, when the animation goes from indoors to outdoors, the information generating unit 186 may determine a route passing through a window or a door, not a wall, as the route of the animation. Also, for example, the information generating unit 186 may determine a route of the agent moving along a surface of a physical object such as a desk, as the route of the animation.

FIGS. 15 and 16 show two examples of the route of the animation that can be determined by the information generating unit 186. While, for convenience of explanation, the route is shown on a two-dimensional screen in FIGS. 15 and 6, in fact, the information generating unit 186 determines the route of the animation in the three-dimensional environment map.

Referring to FIG. 15, the position of the start point of the animation is shown by an oblique area S01. Also, the position of the end point of the animation is shown by an oblique area E01. The start point position S01 is, for example, the position of the imaging device. On the other hand, the end point position E01 is, for example, the position of the wireless AP (including the vicinity). In the example of FIG. 15, the information generating unit 186 determines a route of avoiding a coffee cup 12 as the route of the animation since the coffee cup 12 is present as an obstacle on a line connecting between the start point position S01 and the end point position E01. Also, the first half of the route of the animation extends along the surface of the desk 11.

Referring to FIG. 16, the position of the start point of the animation is shown by an oblique area S02. Also, the position of the end point of the animation is shown by an oblique area E02. The start point position S02 is, for example, the position of the imaging device. On the other hand, the end point position E02 is, for example, the position of the registered user that is registered in advance. In the example of FIG. 16, the information generating unit 186 determines a route of passing through the window 15 as the route of the animation since the end point position E02 is present outdoors.

Next, the information generating unit 186 changes the motion of the animation or the type of the animation according to parameters related to the communication status input from the communication control unit 184, such as a communication rate or a reception level (step S308). FIG. 17 shows a data example of the parameter-animation correspondence table 188c stored in the second storage unit 188 in advance. For example, when the communication rate is high (e.g., 10 MBps or more), the information generating unit 186 sets the agent displayed by the animation to an airplane. Also, for example, when the communication rate is low (e.g., less than 10 MBps), the information generating unit 186 sets the agent displayed by the animation as a pigeon. Also, for example, when the reception level of a radio signal is high, the information generating unit 186 sets a movement speed of an animation following the route determined in step S306 to high. Also, for example, when the reception level of the radio signal is medium, the information generating unit 186 sets the movement speed of the animation following the route to middle. Also, for example, when the reception level of the radio signal is low, the information generating unit 186 sets the movement speed of the animation following the route to low.

The information generating unit 186 generates animation data as information on the three-dimensional animation through such an animation data generation process, and outputs the generated animation data to the position calculating unit 190 and the image superimposing unit 192.

(3) Second Storage Unit

The second storage unit 188 stores the status-animation correspondence table 188a, the start point and end point determination table 188b and the parameter-animation correspondence table 188c as described above, using a storage medium such as a hard disk or a semiconductor memory, in advance. The second storage unit 188 also stores, for example, three-dimensional image data of a character, which is a subject matter of the animation, in addition to the tables.

(4) Position Calculating Unit

The position calculating unit 190 calculates a position at which the animation according to the animation data generated by the information generating unit 186 is to be superimposed on the input image according to Equation (11) of the pinhole model using the position and posture of the imaging device acquired from the environment map generating unit 110. In this case, the three-dimensional position $p_i$ of the feature point $FP_i$ at the right side of Equation (11) is substituted with the three-dimensional position of the animation included in the animation data generated by the information generating unit 186. Further, since the animation in the present embodiment has a motion across a plurality of input images, a set of positions in the input image of the animation changed across the plurality of input images can be calculated by the position calculating unit 190. Further, for example, the posture of the animation in the input image corresponding to the direction of the agent may also be calculated by the position calculating unit 190.

(5) Image Superimposing Unit

The image superimposing unit 192 generates an output image to display the communication status by superimposing the animation according to the animation data generated by the information generating unit 186 on a set of input images input from the imaging unit 102. The image superimposing unit 192 outputs the generated output image to the screen 104.

[2-4. Example of Output Image]

Figure 18:
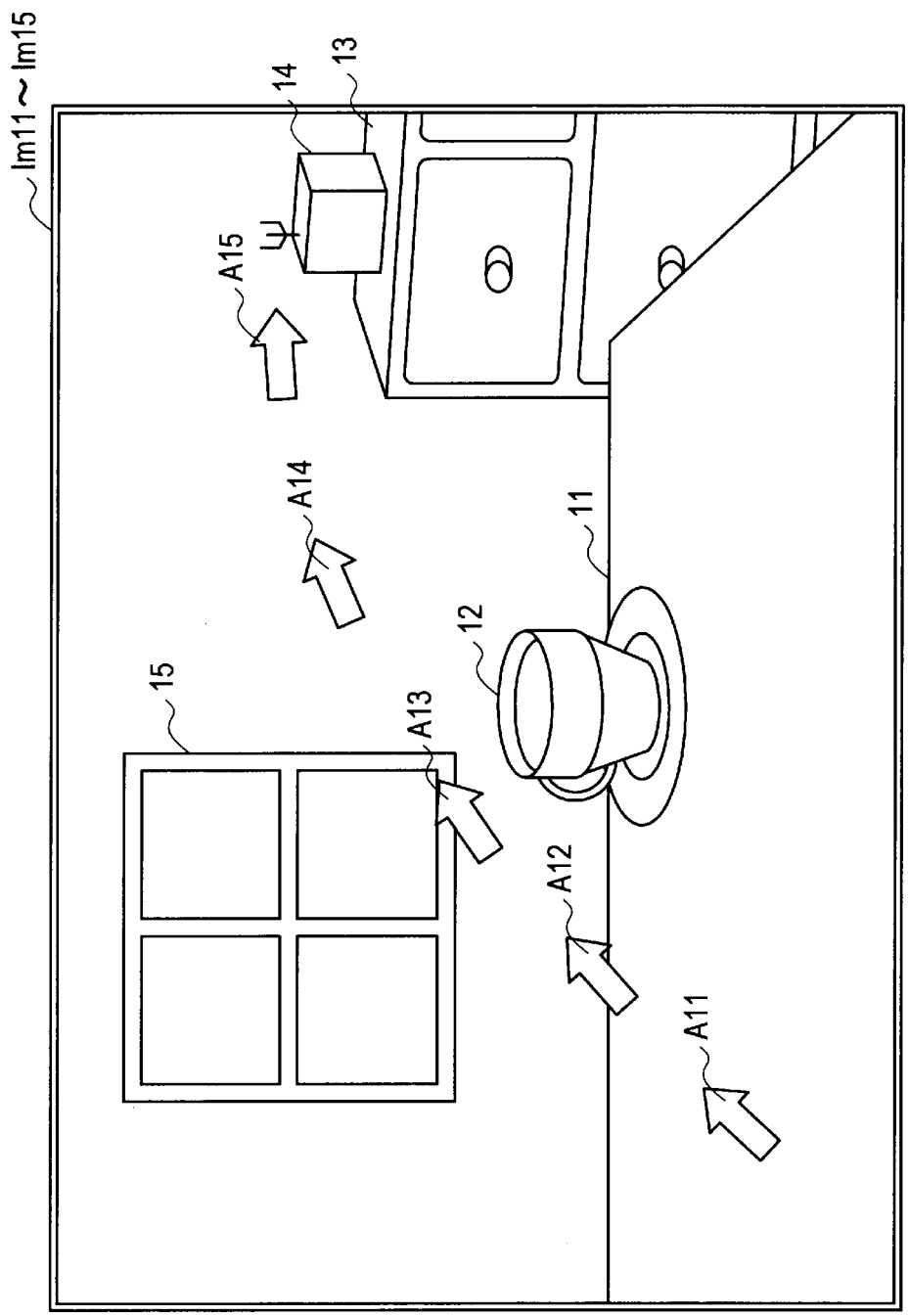
FIG. 18 is an illustrative diagram showing a first example of an output image output by an image processing device according to an embodiment.

FIGS. 18 and 19 show examples of output images that may be displayed on the screen 104 in the present embodiment.

Referring to FIG. 18, output images Im11 to Im15 on which a set of animations A11 to A15 indicating the communication status are superimposed are represented in one illustrative diagram for convenience. In fact, the animation A11 may be superimposed on the output image Im11, the animation A12 on the output image Im12, the animation A13 on the output image Im13, the animation A14 on the output image Im14, and the animation A15 on the output image Im15 in order along a time axis. The animations shown in FIG. 18 are in an arrow shape. Thus, a simpler figure may be used as the animation instead of the agent as a virtual character. In the example of FIG. 18, the animations A11 to A15 are displayed in order, making it possible for the user to recognize, for example, that the image processing device 100 is attempting to access the wireless AP 14. In this case, for example, when the user moves the imaging device to the right, the position of the wireless AP 14 moves in a left direction in the output image and the end point of the animation (the end point of the motion of the arrow) moves in the left direction. Also, for example, in the image processing device 100, when the reception level of the radio signal from the wireless AP 14 is high, a set of animations move at high speed in the output image. On the other hand, when the reception level of the radio signal from the wireless AP 14 is low, the set of animations slowly move in the output image. Further, for example, when the image processing device 100 successfully accesses the wireless AP 14, the animation is changed along a cable connecting between the image processing device 100 and the wireless AP 14. On the other hand, when the image processing device 100 fails to access the wireless AP 14, for example, an x mark may be displayed instead of the animation A15 as the arrow. Such a variety of status indications in the output image showing the real space make it possible for the user to intuitively recognize the status of communication by the image processing device 100.

Referring to FIG. 19, output images Im21 to Im24 on which a set of animations A21 to A24 indicating the communication statuses are superimposed are represented in one illustrative diagram, for convenience. In fact, the animation A21 may be superimposed on the output image Im21, the animation A22 on the output image Im22, the animation A23 on the output image Im23, and the animation A24 on the output image Im24 in order along a time axis. The animation shown in FIG. 19 is a character simulating a carrier pigeon. In the example of FIG. 19, the animations A21 to A24 are displayed in order, making it possible for the user to recognize, for example, that an electronic mail is being transmitted to a friend somewhere outside the house. In this case, in the output images Im21 to Im24, the carrier pigeons A21 to A24 fly outdoors through the window 15 while avoiding the coffee cup 12. Also, for example, when a communication rate of communication means used by the image processing device 100 is high, a character simulating an airplane may be displayed instead of the carrier pigeons. Accordingly, visual sensation is experienced through the vision of the user as if communication involving entities in a real space (in this case, exchange of a letter by the carrier pigeon or the airplane) is performed, and entertainment in the communication is provided. Also, for example, when the transmission of the electronic mail fails, an animation indicating that the carrier pigeon comes back with the letter held in its mouth may be displayed.

3. Example of Hardware Configuration

Further, it does not matter whether the set of processes according to the above-described embodiment are realized by hardware or software. When the set of processes or some of the processes are executed by the software, a program composing the software is executed using a computer incorporated in dedicated hardware or a general-purpose computer shown in FIG. 20, for example.

In FIG. 20, a central processing unit (CPU) 902 controls entire operation of the general-purpose computer. A program or data describing some or all processes in the set is stored in a read only memory (ROM) 904. When the process is executed, the program and data used by the CPU 902 are temporarily stored in a random access memory (RAM) 906.

The CPU 902, the ROM 904 and the RAM 906 are connected to each other via a bus 910. An input/output interface 912 is further connected to the bus 910.

The input/output interface 912 is the interface to connect the CPU 902, the ROM 904 and the RAM 906 with an input device 920, a display device 922, a storage device 924, an imaging device 926 and a drive 930.

The input device 920 receives instructions or information input from the user via an input interface, such as a button, a switch, a lever, a mouse or a keyboard. The display device 922 is composed of a cathode ray tube (CRT), a liquid crystal display, an organic light emitting diode (OLED) or the like, for example, and displays the image on a screen thereof.

The storage device 924 is composed of a hard disk drive or a semiconductor memory, for example, and stores the program and the data. The imaging device 926 corresponds to the hardware of the above-described imaging unit 102 and images a real space using the imaging element such as the CCD or the CMOS. The drive 930 is provided in the general-purpose computer as necessary, and removable media 932 are mounted in the drive 930, for example.

In the case in which the set of processes is executed by software, the program stored in the ROM 904, the storage device 924 or the removable media 932 illustrated in FIG. 26, when executed, is read into the RAM 906 and then executed by the CPU 902.

4. Applications Example

Various applications of the method of displaying communication status described in this disclosure are possible in addition to the above-described embodiment. For example, the degree of security risk according to settings of the wireless LAN may be displayed by the animation superimposed on the input image. Also, for example, when items of a game are exchanged between users, a character holding the items may be superimposed on the input image. Also, for example, statuses of a communication with a wireless AP provided in commercial facilities or train stations are displayed by animations, making it possible to provide road directions to a specific shop or a route.

5. Conclusion

The embodiment of the present invention has been described with reference to FIGS. 1 to 20. According to the present embodiment, a variety of animations indicating the statuses of the communication are generated using the environment map, which three-dimensionally represents a position of a physical object present in a real space. The output image generated by superimposing the animation on the input image is displayed on the screen. Accordingly, the user can more intuitively recognize the status of communication. Also, since a user's experience is as if communication involving entities in the real space is performed, entertainment in the communication can also be provided to the user. Also, since the status of communication, which is normally invisible, appears to involve the entities in the real space, stress felt by the user can be reduced. Also, the animation is generated based on contents of the three-dimensional environment map dynamically updated using the SLAM technology and the position and posture of the camera. Accordingly, even when a camera (e.g., a camera of a mobile phone terminal held by the user) whose position or posture is likely to be changed from moment to moment is used, the animation can be superimposed on a proper position in the image.

While the preferred embodiments of the present invention have been described above with reference to the accompanying drawings, the present invention is not limited to the above examples, of course. A person skilled in the art may find various alternations and modifications within the scope of the appended claims, and it should be understood that they will naturally come under the technical scope of the present invention.

The present application contains subject matter related to that disclosed in Japanese Priority Patent Application JP 2010-021369 filed in the Japan Patent Office on Feb. 2, 2010, the entire content of which is hereby incorporated by reference.

What is claimed is:

1. An image processing device comprising:
a data storage unit having feature data stored therein, the feature data indicating a feature of appearance of one or more physical objects;
an environment map building unit configured to build an environment map based on an input image obtained by imaging a real space using an imaging device and the feature data stored in the data storage unit, the environment map representing a position of a physical object present in the real space;
an information generating unit configured to generate animation data to display an identified status of communication via a communication interface on a screen, using the environment map built by the environment map building unit; and
an image superimposing unit configured to generate an output image by superimposing an animation according to the animation data generated by the information generating unit comprising the identified status of communication on the input image,
wherein the identified status of communication comprises at least one of:
an indication of a completion of at least one of a transmission or a reception of a communication; or
an indication of a failure of at least one of a transmission or a reception of a communication, and
wherein each of the data storage unit, the environment map building unit, the information generating unit, and the image superimposing unit are implemented via at least one processor.

2. The image processing device according to claim 1, wherein the information generating unit determines motion of the animation according to a position of a physical object in a real space represented by the environment map.

3. The image processing device according to claim 1, wherein the information generating unit determines a movement direction of the animation according to a position of a communication party.

4. The image processing device according to claim 1, wherein the information generating unit determines motion of the animation or a type of the animation according to a rate of the communication.

5. The image processing device according to claim 1, wherein the communication is wireless communication, and
the information generating unit determines motion of the animation or a type of the animation according to a reception level of a radio signal in the communication.

6. The image processing device according to claim 1, wherein the information generating unit changes motion of the animation according to whether the communication is successful.

7. The image processing device according to claim 1,
wherein the information generating unit determines motion of the animation or a type of the animation according to a type of communication service realized by the communication.

8. The image processing device according to claim 7,
wherein at least one of the animation motion, or the animation, is varied depending on at least one of the type of communication, a degree of security risk of communication, or a rate of communication, wherein the type of communication comprises at least one of:
an email,
an small messaging system message (SMS),
a communication,
a wired communication,
a wireless communication, and
a wireless access point (AP) access.

9. The image processing device according to claim 1,
wherein the animation is an animation representing a virtual character.

10. The image processing device according to claim 9,
wherein the animation is an animation representing the virtual character, wherein the virtual character comprises a virtual agent.

11. The image processing device according to claim 10,
wherein the animation is an animation representing a virtual character, wherein the virtual character comprises at least one of:
a pet,
an airplane,
an animal,
a pigeon,
a carrier pigeon, and
a bird.

12. The image processing device according to claim 11,
wherein the animation is an animation representing an intuitively recognizable communication status.

13. The image processing device according to claim 11,
wherein the animation further comprises:
providing entertainment in communication of communication status information.

14. The image processing device according to claim 1,
wherein the image processing device further comprises a detection unit configured to dynamically detect a position in the real space of the imaging device based on the input image and the feature data,
a position in the input image at which the animation is superimposed is calculated according to a position in the real space of the imaging device detected by the detection unit, and
wherein the detection unit is implemented via at least one processor.

15. The image processing device according to claim 1,
wherein the input image is of at least one of:
a commercial facility or a station, and
wherein the animation provides directions to at least one of:
a location or a route.

16. The image processing device according to claim 15,
wherein the input image is of the station, and wherein the station comprises a train station.

17. The image processing device according to claim 1, further comprising:
at least one communication control unit configured to identify at least one communication identification data of at least one type of communication, and to provide at least one communication status parameter,
wherein the at least one communication control unit is implemented via at least one processor.

18. The image processing device according to claim 17,
wherein said at least one communication control unit configured to determine said at least one communication identification data, is configured to determine said at least one communication identification data comprising:
a communication source,
a communication destination,
at least one communication address,
at least one communication username,
a communication access point (AP) identifier,
a communication interface identifier,
a communication rate, and
a communication transmission or reception status.

19. An image processing method in an image processing device including a storage medium having feature data stored therein, the feature data indicating a feature of appearance of one or more physical objects, the method comprising:
acquiring an input image obtained by imaging a real space using an imaging device;
building an environment map based on the input image and the feature data, the environment map representing a position of a physical object present in the real space;
generating animation data for displaying an identified status of communication via a communication interface on a screen, using the environment map; and
generating an output image by superimposing an animation according to the animation data comprising the identified status of communication on the input image,
wherein the identified status of communication comprises at least one of:
an indication of a completion of at least one of a transmission or a reception of a communication; or
an indication of a failure of at least one of a transmission or a reception of a communication.

20. A non-transitory computer-readable medium having embodied thereon a computer program product, which when executed by a processor of an image processing device causes the image processing device to perform a method, the method comprising:
building an environment map based on an input image obtained by imaging a real space using an imaging device and feature data, the environment map representing a position of a physical object present in the real space,
wherein the feature data indicates a feature of appearance of one or more physical objects;
generating animation data comprising an identified status of communication via a communication interface, using the built environment map; and
generating an output image by superimposing an animation according to the animation data comprising the identified status of communication on the input image; and
displaying said output image of the identified status of the communication on a screen,
wherein the identified status of communication comprises at least one of:
an indication of a completion of at least one of a transmission or a reception of a communication; or
an indication of a failure of at least one of a transmission or a reception of a communication.

* * * * *